US012798786B2

(12) United States Patent
Dumur et al.

(10) Patent No.: US 12,798,786 B2
(45) Date of Patent: Nov. 17, 2026

(54) METHOD OF PROCESSING ENGINE MONITORING PARAMETERS

(71) Applicants: AIRBUS HELICOPTERS DEUTSCHLAND GMBH, Donauwörth (DE); AIRBUS HELICOPTERS, Marignane Cedex (FR)

(72) Inventors: Guillaume Dumur, Salon de Provence (FR); Carl Ockier, Augsburg (DE)

(73) Assignees: AIRBUS HELICOPTERS DEUTSCHLAND GMBH, Donauworth (DE); AIRBUS HELICOPTERS, Marignane Cedex (FR)

( * ) Notice: Subject to any disclaimer, the term of this patent is extended or adjusted under 35 U.S.C. 154(b) by 205 days.

(21) Appl. No.: 18/617,098

(22) Filed: Mar. 26, 2024

(65) Prior Publication Data

US 2024/0367813 A1 Nov. 7, 2024

(30) Foreign Application Priority Data

May 5, 2023 (EP) .................................... 23315167

(51) Int. Cl.
*B64D 45/00* (2006.01)

(52) U.S. Cl.
CPC .................................... *B64D 45/00* (2013.01)

(58) Field of Classification Search
CPC ....................................................... B64D 45/00
(Continued)

(56) References Cited

U.S. PATENT DOCUMENTS 5,886,649 A 3/1999 Francois
5,908,485 A 6/1999 Germanetti
(Continued)

FOREIGN PATENT DOCUMENTS

CN 105416601 A 3/2016
CN 115743574 A 3/2023
(Continued)

OTHER PUBLICATIONS

Hönle J. et al. "Engine quick start in case of emergency—A requirement for saving fuel by means of engine shutdown", European rotorcraft forum; Amsterdam, NL Sep. 4-7, 2012, pp. 1-8 XP055050645.

(Continued)

*Primary Examiner* — Kam Wan Ma
(74) *Attorney, Agent, or Firm* — BROOKS KUSHMAN P.C.

(57) ABSTRACT

A method of processing engine monitoring parameters in a rotorcraft that comprises at least one rotor and at least two engines for powering the at least one rotor in one of an All Engines Operative mode and a Single Engine Operation mode, wherein the engine monitoring parameters are at least indicative of power margins of one engine of the at least two engines of the rotorcraft, wherein the method comprises displaying an engine monitoring indicator for the one engine of the at least two engines of the rotorcraft for visualizing a current performance state of the one engine; and, if the rotorcraft is operated in the Single Engine Operation mode, displaying a first graphical representation of a Single Engine Operation mode indicator with the engine monitoring indicator for visualizing that the rotorcraft is operated in the Single Engine Operation mode.

17 Claims, 8 Drawing Sheets

(58) Field of Classification Search
USPC .......................................................... 340/439
See application file for complete search history.

(56) References Cited

U.S. PATENT DOCUMENTS

| | | | |
|---|---|---|---|
| 5,915,273 | A | 6/1999 | Germanetti |
| 5,986,580 | A | 11/1999 | Permanne |
| 6,195,598 | B1 * | 2/2001 | Bosqui ..................... G01D 7/04 340/963 |
| 7,143,003 | B2 | 11/2006 | Certain |
| 10,173,787 | B1 * | 1/2019 | Oltheten ................ B64D 45/00 |
| 10,773,814 | B2 | 9/2020 | Strauss et al. |
| 2006/0287778 | A1 | 12/2006 | Oltheten et al. |
| 2010/0083631 | A1 | 4/2010 | Foster et al. |
| 2012/0253560 | A1 | 10/2012 | Corpron et al. |
| 2013/0054053 | A1 | 2/2013 | Greenfield et al. |
| 2018/0201386 | A1 | 7/2018 | Strauss et al. |
| 2022/0185503 | A1 | 6/2022 | Razakarivony et al. |

FOREIGN PATENT DOCUMENTS

| | | | |
|---|---|---|---|
| EP | 0816226 | B1 | 1/2002 |
| EP | 0811553 | B1 | 10/2002 |
| FR | 2756256 | A1 | 5/1998 |
| FR | 2973340 | A1 | 10/2012 |
| JP | 2012505113 | A | 3/2012 |
| KR | 20070122196 | A | 12/2007 |

OTHER PUBLICATIONS

European Search Report for European Application No. EP 23315167.9, Completed by the European Patent Office, Dated Sep. 27, 2023, 8 pages.

First Office Action for Korean Application No. KR 10-2024-0041340, completed by the Korean Intellectual Property Office, dated May 28, 2026, 14 pages (including English machine translation).

* cited by examiner

METHOD OF PROCESSING ENGINE MONITORING PARAMETERS

CROSS-REFERENCE TO RELATED APPLICATIONS

This application claims priority to European patent application No. EP 23315167.9 filed on May 5, 2023, the disclosure of which is incorporated in its entirety by reference herein.

TECHNICAL FIELD

The disclosure is related to a method of processing engine monitoring parameters in a rotorcraft that comprises at least one rotor and at least two engines for powering the at least one rotor in one of an All Engines Operative mode and a Single Engine Operation mode, wherein the engine monitoring parameters are at least indicative of power margins of one engine of the at least two engines of the rotorcraft. The disclosure is further related to a data processing system that is configured to perform such a method of processing engine monitoring parameters, and a rotorcraft comprising such a data processing system.

BACKGROUND

More generally, in a rotorcraft that comprises at least one rotor and at least two engines for powering the at least one rotor in one of an All Engines Operative (AEO) mode and a Single Engine Operation ((SEO) mode, the SEO mode is mainly intended to enable in cruise flight during a given flight mission a reduction in fuel consumption of the rotorcraft by shutting down or lowering down to desynchronization, i. e. zero power, one of the at least two engines such that another one of the at least two engines is required to handle the flight mission alone with an increased power request. In fact, even when operating in a comparatively high loaded power regime with the increased power request, the other one of the at least two engines will generally consume less fuel than required by the one and the other one of the at least two engines together in a comparatively low loaded power regime with reduced power request.

If a given rotorcraft is operated in SEO mode, a respectively idled or shut down engine is usually restarted at the end of cruise flight to switch the operating mode of the given rotorcraft back to AEO mode. However, restarting of the idled or shut down engine may also be required e.g., if the currently operating engine fails or if additional power is required during the flight mission.

In any case the SEO mode represents an unusual power situation of a rotorcraft as conventionally the only power situation in which an engine is shut down or lowered down is the case of an actual engine failure. Therefore, operating a rotorcraft in SEO mode requires a suitable observation of relevant engine monitoring parameters which are at least indicative of power margins of a respectively operating engine of the rotorcraft in the SEO mode. For instance, three operating parameters of a given rotorcraft may be considered as relevant engine monitoring parameters which are at least indicative of power margins of a respectively operating engine of the rotorcraft in the SEO mode, namely a rotational speed of the engine, torque measured at the engine, and a temperature measured at the engine.

It is known and described in the documents FR 2 756 256 and FR 2 973 340, or in documents US 2013/054053 and CN 105 416 601, to make use of these various engine monitoring parameters for implementing power margin indicators. Such power margin indicators are intended to provide a pilot of a rotorcraft with a summary indication of available power margins that serves as a replacement for a plurality of conventional indicators which are generally dispersed over the instrument panel in the rotorcraft.

More specifically, in order to simplify the workload of a pilot of a given rotorcraft, current power margin indicator devices, also known as first limit indicator devices, provide the pilot with a power margin indication that has been converted into a margin for the collective pitch of the rotor blades of the given rotorcraft. For instance, each FLI device determines the power margin of an associated engine of the given rotorcraft on the basis of the relevant engine monitoring parameters N1, TRQ, and TOT, and subsequently converts the determined power margin into an equivalent margin for the collective pitch of the rotor blades of the given rotorcraft.

By way of example, the document U.S. Pat. No. 6,195,598 B1 describes a display screen of an FLI device, wherein a collective pitch index can be shown e. g. in a stationary manner to indicate a current collective pitch of the rotor blades of the given rotorcraft. The collective pitch index may be associated with a movable scale that is graduated in collective-pitch equivalents and capable of moving past the collective pitch index. Associated power request limitations for an engine of the given rotorcraft are represented by movable markings associated with the movable scale, such as dashed or dotted lines or bands.

Generally, an FLI device is very simple to use for a pilot of a rotorcraft. In fact, as long as the collective pitch index shown on the display screen is below a visualized power request limitation for a given engine of the rotorcraft, the power request limitation cannot be exceeded without an adequate action of the pilot on a suitable control member, such as a collective pitch stick for the rotor blades of the rotorcraft.

However, although an FLI device is very simple to use for a pilot of a rotorcraft, it might lead the pilot to erroneous assumptions if the rotorcraft is operated in the SEO mode. More specifically, the FLI device may indicate sufficient power margins to the pilot for initiating a flight maneuver that should be avoided with only one engine operative, such as e. g. a descending operation or a flight maneuver that would at the end require the power of more than one engine. Nevertheless, although entering of the SEO mode requires usually a dedicated pilot action, the pilot may overlook the fact that the rotorcraft is actually operated in the SEO mode when considering the indications on the FLI device.

Other engine monitoring parameter indicators are e. g. described in the documents CN 115 743 574 A, U.S. Pat. Nos. 7,143,003 B2, 5,986,580 A, 5,908,485 A, EP 0 816 226 B1, and EP 0 811 553 B1.

SUMMARY

It is an object of the present disclosure to provide a new method of processing engine monitoring parameters in a rotorcraft, which is suitable to enable at least a pilot of the rotorcraft to determine at any point of time in which mode the rotorcraft is currently operated. Other objects of the present disclosure are to provide a new data processing system configured to perform such a new method of processing engine monitoring parameters, as well as to provide a new rotorcraft comprising such a new data processing system.

One of the above-described objects is solved by a method of processing engine monitoring parameters in a rotorcraft. More specifically, according to the present disclosure a method of processing engine monitoring parameters in a rotorcraft that comprises at least one rotor and at least two engines for powering the at least one rotor in one of an AEO mode and a SEO mode is provided, wherein the engine monitoring parameters are at least indicative of power margins of one engine of the at least two engines of the rotorcraft. The method comprises displaying an engine monitoring indicator for the one engine of the at least two engines of the rotorcraft for visualizing a current performance state of the one engine, and determining whether the rotorcraft is operated in the AEO mode, wherein the at least two engines are powering the at least one rotor, or in the SEO mode, wherein only the one engine of the at least two engines is powering the at least one rotor. In response to determining that the rotorcraft is operated in the SEO mode, a first graphical representation of a SEO mode indicator is displayed with the engine monitoring indicator for visualizing that the rotorcraft is operated in the SEO mode.

Advantageously, the SEO mode indicator gives a visual indication that the rotorcraft is operated in the SEO mode such that the pilot of the rotorcraft may immediately identify at first glance that the rotorcraft is operated in the SEO mode with a single engine powering the rotor of the rotorcraft. In particular, the SEO mode indicator clearly adverts the pilot that operation of the rotorcraft in the SEO mode and powering the rotor of the rotorcraft with a single engine is intentional and e. g. activated for fuel consumption reduction, so that it should be considered as a normal operation mode in contrast to a failure operation mode, such as a One Engine Inoperative operation mode, wherein powering of the rotor of the rotorcraft with the single engine is not intentional, but mandatory due to a failure. Accordingly, as the pilot is always aware that the rotorcraft is operated in the SEO mode, initiation of a flight maneuver that would at the end require the power of more than one engine may be avoided. Likewise, a descending operation with only one engine active may be avoided.

According to one aspect, the inventive method of processing engine monitoring parameters is implemented using a new type of monitoring logics provided for improving operation of the rotorcraft in the SEO mode. These new monitoring logics are preferably configured to enhance one or more of an FLI device, engine details indicators in a Vehicle Management System page, and a triple speed indicator.

More specifically, for the FLI device the new type of monitoring logics may be configured to control display of a particular SEO mode indicator that allows to quickly identify a current operation mode of the rotorcraft. For instance, the particular SEO mode indicator may be displayed according to an associated graphical representation for indicating to the pilot that the SEO mode is available, and according to a different graphical representation for indicating to the pilot that the SEO mode is entered.

By way of example, the particular SEO mode indicator may comprise displaying the acronym "SEO" on the FLI device, however, any other acronym or indication may likewise be used. The acronym "SEO" may be displayed in an empty rectangle or any other geometric shape for indicating to the pilot that the SEO mode is available, and the rectangle may be filled for indicating to the pilot that the SEO mode is entered. The rectangle as such may be blue and it may be filled with blue color, but any other color such as e. g. green is likewise contemplated.

Furthermore, some predetermined "SEO" limits may be indicated in the FLI device using e. g. a blue box or any other suitably colored geometric shape, similar to visualization of a Maximum Continuous Power (MCP) indicator in a conventional FLI device. Thus, if a currently requested power visualized e. g. by a suitable collective-pitch equivalent indicator is lower, i. e. below the blue box, operation in the SEO mode is considered to be nominal. Accordingly, a lower limit or bottom of the blue box may be considered to form a continuous SEO power limit, i. e. a maximum allowable continuous nominal power request. If the currently requested power is above the continuous SEO power limit, i. e. within the blue box, the operation in the SEO mode is no more considered to be nominal, but there is no need to exit the SEO mode manually, so that the blue box may be considered to indicate an allowable non-nominal SEO power request range. If, however, the currently requested power passes above an upper limit or top of the blue box, which may e. g. be marked with an amber bar or any other suitably colored geometric shape, then the currently requested power is considered to be too high for the operation in the SEO mode and the pilot should manually exit the SEO mode. Accordingly, a lower limit or top of the blue box, i. e. the amber bar, may form a maximum SEO power limit, i. e. a maximum allowable non-nominal SEO power request. Finally, conventional OEI limit indicators may be displayed, e. g. in the form of red lines or any other suitably colored geometric shapes, to indicate to the pilot associated OEI power margins in case of an actual engine failure of the idled engine.

Advantageously, the new type of monitoring logics provided for improving operation of the rotorcraft in the SEO mode further allows to adapt the detailed engine performance indication page, i. e. the so-called Vehicle Management Display (VMD) page in a rotorcraft. More particularly, engine performance parameter indicators associated with the engine currently in power, i. e. the currently operating engine, displayed in the VMD page may be provided with the indicators described above, i. e. for instance with the blue box, the amber line and the red lines.

Furthermore, the engine performance parameter indicators associated with the engine currently in power, i. e. the currently operating engine, may e. g. be provided in the VMD page with the particular SEO mode indicator described above. Alternatively, or in addition, the engine performance parameter indicators associated with the other engine that is idled in the SEO mode, i. e. the idled engine, may e. g. be displayed in the VMD page together with an associated super idle indicator displaying the term "Super Idle" or "S.IDLE". Alternatively, or in addition, the engine performance parameter indicators associated with the other engine that is shut off in the SEO mode, i. e. the shut down engine, may e.g., be displayed in the VMD page together with an associated shut-off standby indicator displaying the term "OFF standby" or any other suitable term.

Advantageously, the new type of monitoring logics provided for improving operation of the rotorcraft in the SEO mode also allows to adapt the triple speed indicator NR/N2 which may be modified such that the pilot of the rotorcraft has information that is consistent with the information visualized by means of the FLI device and may, thus, correctly identify the flight phase in the SEO mode. For instance, the idled or shut down engine may be identified in the SEO mode by means of an associated color code and a reverse video.

Preferably, the new type of monitoring logics provided for improving operation of the rotorcraft in the SEO mode further allows implementation of a dedicated monitoring in case of a failure of the currently operating engine in the SEO mode. Preferentially, in case of such a failure in the SEO mode the idled or shut down engine will restart automatically and an indication may be displayed for the pilot so that the pilot may handle the failure without interfering with the system.

More specifically, according to one aspect two indications may be displayed e. g. on the FLI device for indicating to the pilot that the idled or shut down engine is restarting: a first indicator showing the current state of the idled or shut down engine, i. e. an engine restart indicator, and an associated visualization of a respective gas generator speed increase, i. e. an engine speed increase indicator of the restarting engine. For instance, the engine restart indicator may comprise the acronym "F.RSTRT", however, any other acronym or indication may likewise be used. The acronym "F.RSTRT" may be displayed in an empty rectangle or any other geometric shape for indicating to the pilot that the idled engine is restarting. Furthermore, the engine restart indicator may be provided with an additional indication such as "FAST" if a specific restart is commanded.

Moreover, the visualization of the respective gas generator speed increase may e. g. be associated with display of a suitable bar graph inside or outside of the empty rectangle to indicate the respective gas generator speed N1 or any other parameter suitable for showing the progress during engine start and/or acceleration. However, preferably no other limitation or respective limit indicators, such as the blue box, the amber line, and the red lines described above, are displayed in the FLI display during restarting of the idled or shut down engine.

If, however, restart of the idled or shut down engine is merely initiated for exiting the SEO mode without being required as a result of a failure of the currently operating engine in the SEO mode, e. g. in case of a manually pilot-commanded exit of the SEO mode, or if the idled or shut down engine is restarted at normal speed upon a detected minor failure, preferably at least the engine restart indicator is displayed in the FLI device. However, the engine restart indicator may merely comprise the acronym "RSTRT" or any other suitable acronym to indicate that a normal restart is performed and display of the engine speed increase indicator may be omitted. Nevertheless, the OEI limit indicators described above may be displayed during normal restart, e. g. until reaching operation in the AEO mode.

According to some aspects, the method further comprises, in response to determining that the rotorcraft is operated in the AEO mode, displaying a second graphical representation of the SEO mode indicator with the engine monitoring indicator for visualizing that the SEO mode is available.

According to some aspects, displaying an engine monitoring indicator for the one engine of the at least two engines of the rotorcraft for visualizing a current performance state of the one engine comprises displaying a FLI including: a reference line associated with collective-pitch equivalents of engine power requests, a first indicator representing a collective-pitch equivalent of a maximum 30-second OEI power request, a second indicator representing a collective-pitch equivalent of a maximum 2-minute OEI power request, and a third indicator representing a collective-pitch equivalent of a current power request.

The method may further comprise, in response to determining that the rotorcraft is operated in the SEO mode, displaying a fourth indicator representing a collective-pitch equivalent of a maximum allowable non-nominal power request of the one engine of the at least two engines of the rotorcraft in the SEO mode.

The method may further comprise, in response to determining that the rotorcraft is operated in the SEO mode, displaying a fifth indicator representing a collective-pitch equivalent of an allowable non-nominal power request range of the one engine of the at least two engines of the rotorcraft in the SEO mode, wherein the allowable non-nominal power request range extends between a maximum allowable continuous nominal power request of the one engine of the at least two engines of the rotorcraft in the SEO mode and the maximum allowable non-nominal power request.

The method may further comprise, in response to determining that the rotorcraft is operated in the SEO mode, determining whether a current power request is above the maximum allowable non-nominal power request and below the maximum 30-second OEI power request of the one engine of the at least two engines of the rotorcraft, and, in response to determining that the current power request is above the maximum allowable non-nominal power request and below the maximum 30-second OEI power request, displaying a sixth indicator representing an alert range requesting a pilot of the rotorcraft to switch manually from the SEO mode to the AEO mode.

The sixth indicator may extend between the fourth indicator and the first indicator.

The method may further comprise, in response to determining that the rotorcraft is operated in the SEO mode, displaying a seventh indicator representing a collective-pitch equivalent of the maximum allowable continuous nominal power request of the one engine of the at least two engines of the rotorcraft in the SEO mode.

According to some aspects, displaying an engine monitoring indicator for the one engine of the at least two engines of the rotorcraft for visualizing a current performance state of the one engine comprises displaying at least one engine performance parameter indicator including: a reference line associated with engine performance parameters of the one engine of the at least two engines of the rotorcraft, a first indicator representing a performance parameter equivalent of a maximum 30-second OEI power request, and a second indicator representing a performance parameter equivalent of a maximum 2-minute OEI power request.

The at least one engine performance parameter indicator may comprise at least one of a torque indicator, a temperature indicator, and a rotational speed indicator for the one engine of the at least two engines of the rotorcraft.

The method may further comprise, in response to determining that the rotorcraft is operated in the SEO mode, displaying a third indicator representing a performance parameter equivalent of a maximum allowable non-nominal power request of the one engine of the at least two engines of the rotorcraft in the SEO mode.

The method may further comprise, in response to determining that the rotorcraft is operated in the SEO mode, displaying a fourth indicator representing a performance parameter equivalent of an allowable non-nominal power request range of the one engine of the at least two engines of the rotorcraft in the SEO mode, wherein the allowable non-nominal power request range extends between a maximum allowable continuous nominal power request of the one engine of the at least two engines of the rotorcraft in the SEO mode and the maximum allowable non-nominal power request.

Furthermore, displaying an engine monitoring indicator for the one engine of the at least two engines of the rotorcraft for visualizing a current performance state of the one engine may comprise displaying a triple speed indicator NR/N2.

According to some aspects, the method further comprises, in response to determining that the rotorcraft is operated in the SEO mode, determining whether another one of the at least two engines is restarted for powering the at least one rotor, and, in response to determining that the other one of the at least two engines is restarted for powering the at least one rotor, displaying an engine restart indicator with the engine monitoring indicator for visualizing that the other one of the at least two engines is restarted.

Furthermore, displaying an engine restart indicator with the engine monitoring indicator for visualizing that the other one of the at least two engines is restarted may comprise displaying a restarting engine state indicator for visualizing a current state of the other one of the at least two engines that is restarted.

Another one of the above-described objects is solved by a data processing system for a rotorcraft. More specifically, according to the present disclosure a data processing system for a rotorcraft that comprises at least one rotor and at least two engines for powering the at least one rotor in one of an AEO mode and a SEO mode is provided. The data processing system comprises at least one computing device and at least one display means. The data processing system is configured to perform a method of processing engine monitoring parameters as described above.

Still another one of the above-described objects is solved by a rotorcraft. More specifically, according to the present disclosure a rotorcraft with at least one rotor and at least two engines for powering the at least one rotor in one of an AEO mode and a SEO mode is provided. The rotorcraft comprises a data processing system with at least one computing device and at least one display means. The data processing system is configured to perform a method of processing engine monitoring parameters as described above.

BRIEF DESCRIPTION OF THE DRAWINGS

Preferred embodiments of the disclosure are outlined by way of example in the following description with reference to the attached drawings. In these attached drawings, identical or identically functioning components and elements are labeled with identical reference numbers and characters and are, consequently, only described once in the following description, wherein.

DETAILED DESCRIPTION

Figure 1:
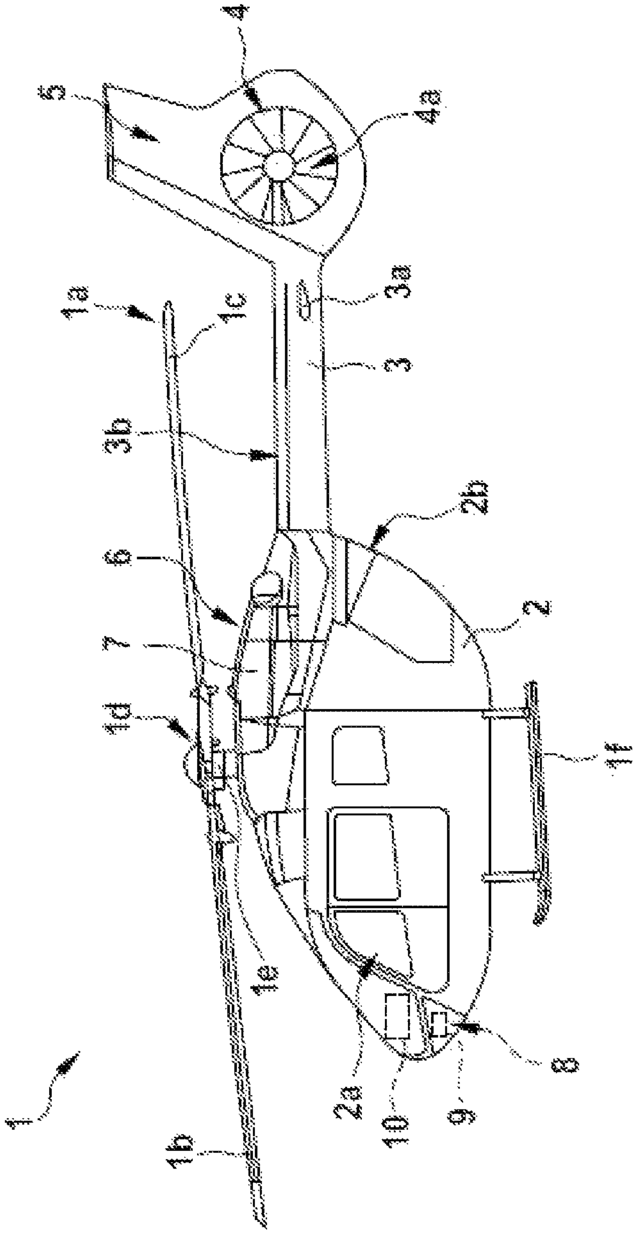
FIG. 1 shows a lateral view of an illustrative rotorcraft that comprises a data processing system configured to perform a method of processing engine monitoring parameters according to the present disclosure.

FIG. 1 shows an aircraft 1 that is illustratively embodied as a rotorcraft and, more particularly, as a helicopter. Thus, for purposes of simplicity and clarity, the aircraft 1 is hereinafter referred to as the "helicopter 1". The present disclosure is, however, not limited to helicopters and may likewise be applied to any other rotorcraft.

The helicopter 1 comprises at least one rotor 1*a*, by way of example a multi-blade main rotor, for providing lift and forward or backward thrust during operation. By way of example, the at least one rotor 1*a* comprises a plurality of rotor blades which are connected at an associated rotor head 1*d* to a rotor shaft 1*e*, which rotates in operation of the helicopter 1 about an associated rotor axis. Two rotor blades of the plurality of rotor blades are illustratively separately labelled with the reference signs 1*b*, 1*c*.

Moreover, the helicopter 1 preferably comprises a fuselage 2 to which a landing gear if of the skid-type is attached. By way of example, a left-hand side of the fuselage 2 is shown and, thus, a portside wall of the fuselage 2 of the helicopter 1. Illustratively, the fuselage 2 forms an aircraft interior region that accommodates a cockpit 2*a* and that may further accommodate a cabin for passengers and/or cargo. Moreover, the fuselage 2 may be connected at a rear fuselage 2*b* to a tail boom 3 with a horizontal stabilizer 3*a*. The tail boom 3 may be implemented as a slim beam element that comprises at least a tubular tail boom cone 3*b*.

Illustratively, the helicopter 1 further comprises at least one preferentially shrouded counter-torque device 4 configured to provide counter-torque during operation, i. e. to counter the torque created by rotation of the at least one rotor 1*a* for purposes of balancing the helicopter 1 in terms of yaw. The at least one counter-torque device 4 is illustratively provided at an aft section of the tail boom 3 and preferably comprises a tail rotor 4*a*. The aft section of the tail boom 3 may further comprise a fin 5.

According to the present disclosure, the helicopter 1 comprises at least two engines 6 for powering the at least one rotor 1*a* in one of an AEO mode and a SEO mode. Furthermore, the helicopter 1 comprises a data processing system 8 with at least one computing device 9 and at least one display means 10, wherein the data processing system 8 is configured to perform a method of processing engine monitoring parameters which are at least indicative of power margins of one engine 7 of the at least two engines 6.

At this point, it should be noted that only the engine 7 is visible in FIG. 1, as it is arranged on the left-hand side of the helicopter 1. However, the helicopter 1 is, by way of example, embodied with a twin-engine configuration having two engines such that the at least two engines 6 comprise in addition to the engine 7 another engine that may e. g. be arranged on a right-hand side of the helicopter 1 such that it is not visible in FIG. 1.

It should further be noted that by way of example, and not for limiting the disclosure accordingly, the engine 7 is considered hereinafter to be the single engine that operates in the SEO mode for powering the at least one rotor 1*a*. Accordingly, the other engine that may e. g. be arranged on the right-hand side of the helicopter 1 is considered hereinafter to be idled or shut down in the SEO mode, i. e. to be the idled or shut down engine.

Figure 2B:
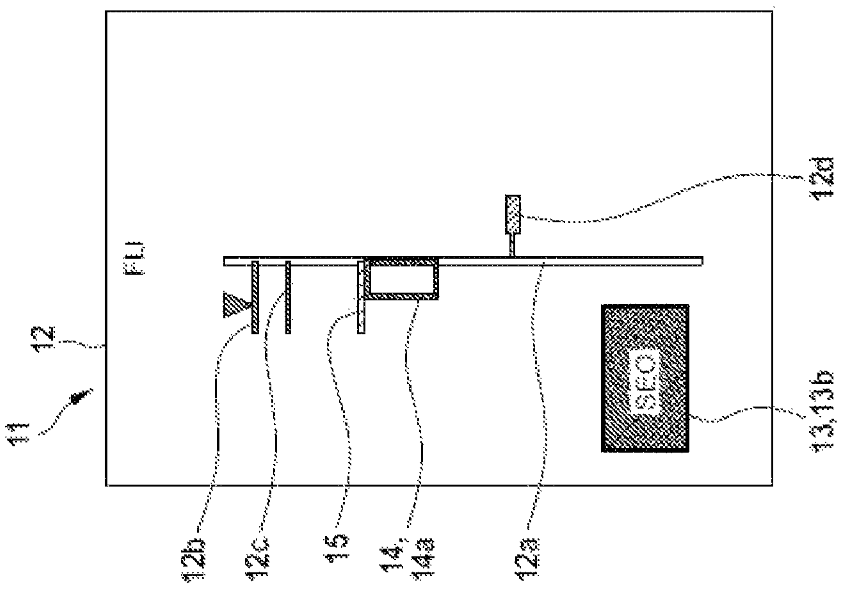
FIGS. 2A-2B, 3A-3B and 4A-4B show schematic views of an engine monitoring indicator with a FLI for illustrating a method of processing engine monitoring parameters according to the present disclosure.
Figure 2A:
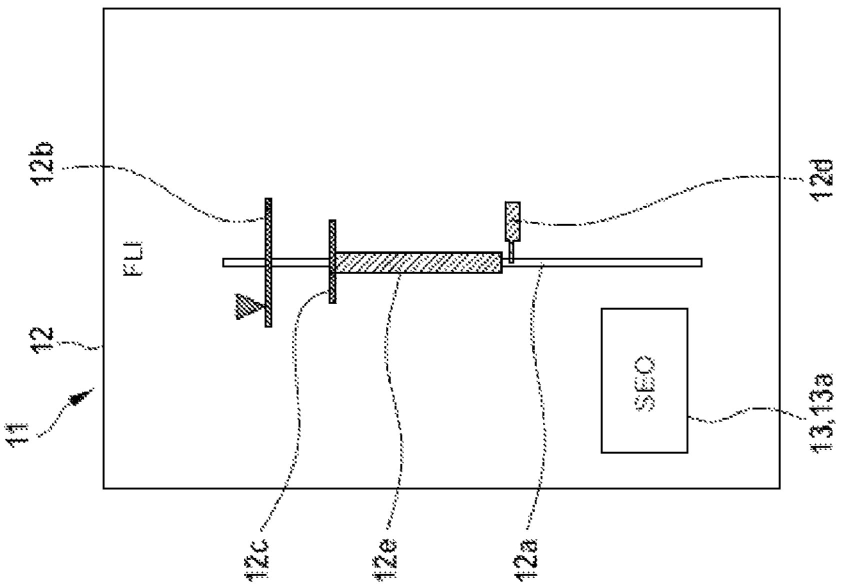
Figure 3B:
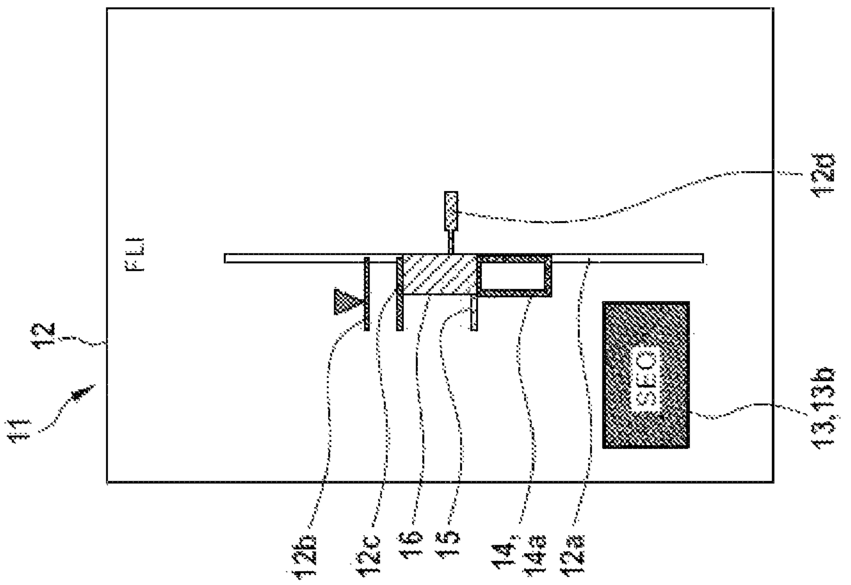
Figure 3A:
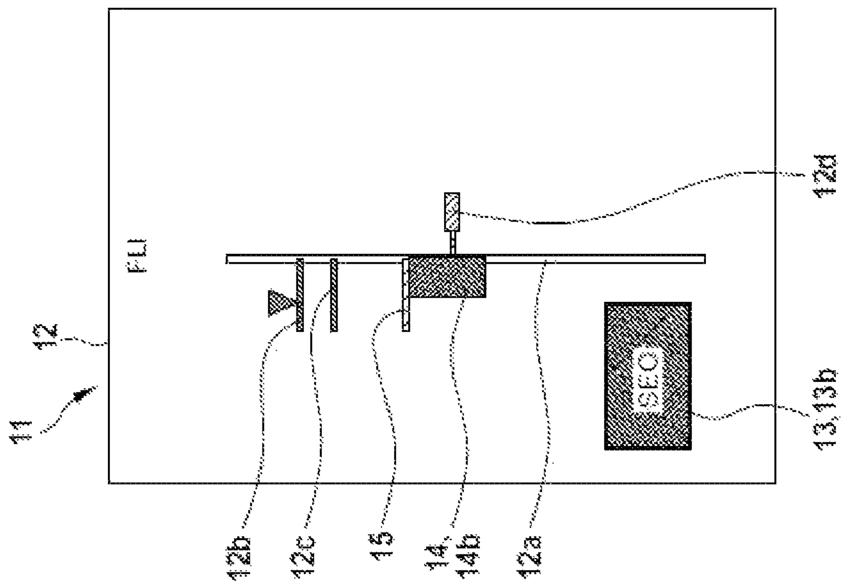

FIG. 2 and FIG. 3 show in part and part, respectively, an engine monitoring indicator 11 which is used for implementing a method of processing engine monitoring parameters in a rotorcraft that comprises at least one rotor and at least two engines for powering the at least one rotor in one of an AEO mode and a SEO mode, e. g. the helicopter 1 of FIG. 1 with the rotor 1*a* and the two engines 6 which comprise the engine 7. The engine monitoring parameters which are processed are at least indicative of power margins of one engine of the at least two engines, e. g. of the engine 7 of FIG. 1.

The method of processing engine monitoring parameters according to the present disclosure is described in detail hereinafter with reference to FIG. 2 to FIG. 4, in the context of the helicopter 1 of FIG. 1.

More specifically, according to the method of processing engine monitoring parameters initially the engine monitoring indicator 11 is displayed. For instance, the engine monitoring indicator 11 may at least be displayed for the engine 7 of the helicopter 1 of FIG. 1 for visualizing at least a current performance state of the engine 7.

Then, it is determined whether the helicopter 1 is operated in the AEO mode, wherein the at least two engines 6 are powering the at least one rotor 1*a* together, or in the SEO mode, wherein e. g. only the engine 7 is powering the at least one rotor 1*a* as described above. If it is determined that the helicopter 1 is operated in the AEO mode, a graphical representation 13*a* of a SEO mode indicator 13 may be displayed with the engine monitoring indicator 11, in response to determining that the helicopter 1 is operated in the AEO mode, for visualizing that the SEO mode is available, as illustrated in part (A) of FIG. 2. If, however, it is determined that the helicopter 1 is operated in the SEO mode, a graphical representation 13*b* of the SEO mode indicator 13 is displayed with the engine monitoring indicator 11, in response to determining that the helicopter 1 is operated in the SEO mode, for visualizing that the helicopter 1 is operated in the SEO mode, as illustrated in part (B) of FIG. 2.

Illustratively, the graphical representation 13*a* of the SEO mode indicator 13 in part (A) of FIG. 2 comprises an empty rectangle provided with the acronym "SEO" on the engine monitoring indicator 11. For instance, the rectangle and the acronym may be represented in blue. However, any other acronym or indication, as well as any other geometric shape and/or color may likewise be used.

The graphical representation 13*b* of the SEO mode indicator 13 in part (B) of FIG. 2, in turn, illustratively comprises a filled or plain rectangle provided with the acronym "SEO" on the engine monitoring indicator 11. For instance, the filled or plain rectangle may be represented in blue and the acronym in white. However, any other acronym or indication, as well as any other geometric shape and/or color may likewise be used.

By way of example, the engine monitoring indicator 11 is embodied to represent a FLI 12. Illustratively, the FLI 12 includes a reference line 12*a* associated with collective-pitch equivalents of engine power requests, an indicator 12*b* representing a collective-pitch equivalent of a maximum 30-second OEI power request, an indicator 12*c* representing a collective-pitch equivalent of a maximum 2-minute OEI power request, and an indicator 12*d* representing a collective-pitch equivalent of a current power request.

The reference line 12*a* may e. g. be represented in white, the indicators 12*b*, 12*c* may e. g. be represented as red lines, and the indicator 12*d* may be illustrated as a yellow pin. However, any other colors or geometric shapes are likewise contemplated.

At this point, it should be noted that functionality and functioning of the FLI 12 as such are considered to be well-known to the person skilled in the art and, therefore, not described in detail hereinafter.

It should further be noted that part A) of FIG. 2 shows the FLI 12 for both engines 6 which are operative in the AEO mode. Thus, an indicator 12*e* of a currently available power range for both engines 6 below the maximum 2-minute OEI power request, i. e. below the indicator 12*c*, may be visualized with the FLI 12, as illustrated in part (A) of FIG. 2. By way of example, the indicator 12*e* is implemented by means of a yellow bar. However, any other color or geometric shape is likewise contemplated.

In contrast thereto, part (B) of FIG. 2 shows the FLI 12 only for the engine 7 of FIG. 1 which is operative in the SEO mode. Therefore, the indicator 12*e* is removed and an indicator 15 representing a collective-pitch equivalent of a maximum allowable non-nominal power request of the engine 7 in the SEO mode may be displayed. Furthermore, an indicator 14 representing a collective-pitch equivalent of an allowable non-nominal power request range of the engine 7 in the SEO mode may be displayed, wherein the allowable non-nominal power request range extends between a maximum allowable continuous nominal power request of the engine 7 in the SEO mode and the maximum allowable non-nominal power request visualized with the indicator 15.

For instance, the indicator 14 may be implemented by means of a blue rectangle and the indicator 15 by means of an amber line. However, any other colors or geometric shapes are likewise contemplated.

Illustratively, the indicator 14 touches on its—in part (B) of FIG. 2—upper side the indicator 15 which, thus, forms the upper limit of the indicator 14. A—in part B) of FIG. 2—lower side of the indicator 14 corresponds to the maximum allowable continuous nominal power request of the engine 7 in the SEO mode.

As long as it may be determined in operation of the helicopter 1 in the SEO mode that the current power request of the engine 7, which is visualized by the indicator 12*d*, is outside the allowable non-nominal power request range visualized by the indicator 14, the latter is preferably represented according to a graphical representation 14*a* according to part (B) of FIG. 2. By way of example, in the graphical representation 14*a* the indicator 14 is represented as an empty shape, as illustrated in part (B) of FIG. 2.

If, however, it is determined that the current power request of the engine 7, which is visualized by the indicator 12*d*, is inside the allowable non-nominal power request range visualized by the indicator 14, the latter is preferably represented according to a graphical representation 14*b* according to part (A) of FIG. 3. By way of example, in the graphical representation 14*b* the indicator 14 is represented as a filled or plain shape, as illustrated in part (B) of FIG. 2. If the indicator 14 is implemented by means of the blue rectangle as described above, then the graphical representation 14*b* is preferably a blue rectangle filled with blue color. However, any other color or geometric shape is likewise contemplated.

Moreover, if it is determined in operation of the helicopter 1 in the SEO mode that a current power request of the engine 7 is above the maximum allowable non-nominal power request visualized by the indicator 15 and below the maximum 30-second OEI power request visualized by the indicator 12*c*, an indicator 16 may be displayed with the FLI 12 for representing an alert range as illustrated in part (B) of FIG. 3, thus, requesting a pilot of the helicopter 1 to switch manually from the SEO mode to the AEO mode.

Illustratively, the indicator 16 extends between the indicator 15 and the indicator 12*b*. The indicator 16 may e. g. be implemented by means of a filled or plain amber rectangle. However, any other color or geometric shape is likewise contemplated.

Figure 4B:
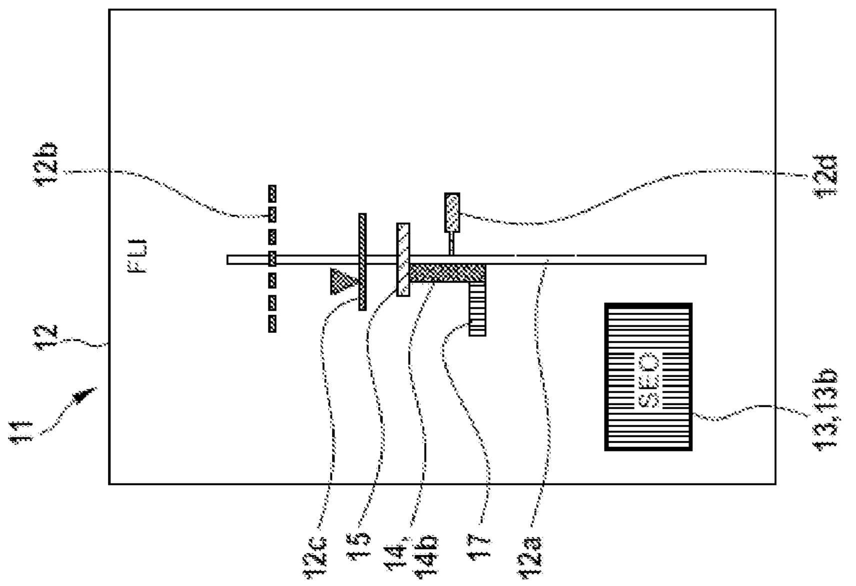
Figure 4A:
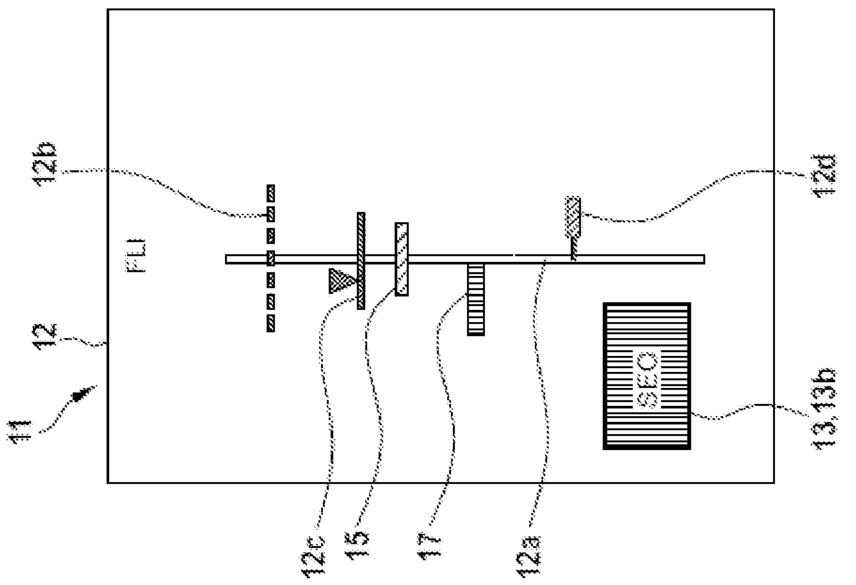

FIG. 4 shows in part (A) and part (B), respectively, a variant of the engine monitoring indicator 11 with the FLI 12 of FIG. 2 and FIG. 3. In contrast to FIG. 2 and FIG. 3, the maximum allowable continuous nominal power request of the engine 7 of FIG. 1 in the SEO mode is now represented by a separate indicator 17. More specifically, in response to determining that the helicopter 1 is operated in the SEO mode, the indicator 17 may be displayed to represent a collective-pitch equivalent of the maximum allowable continuous nominal power request of the engine 7 in the SEO mode. The indicator 17 may e. g. be implemented by means of a green line. However, any other color or geometric shape is likewise contemplated.

Furthermore, as described above at FIG. 2 and FIG. 3, the SEO mode indicator 13 must not necessarily be implemented by means of an empty or filled blue rectangle. Instead, any other geometric shape and/or color may likewise be used, as schematically indicated.

Figure 5:
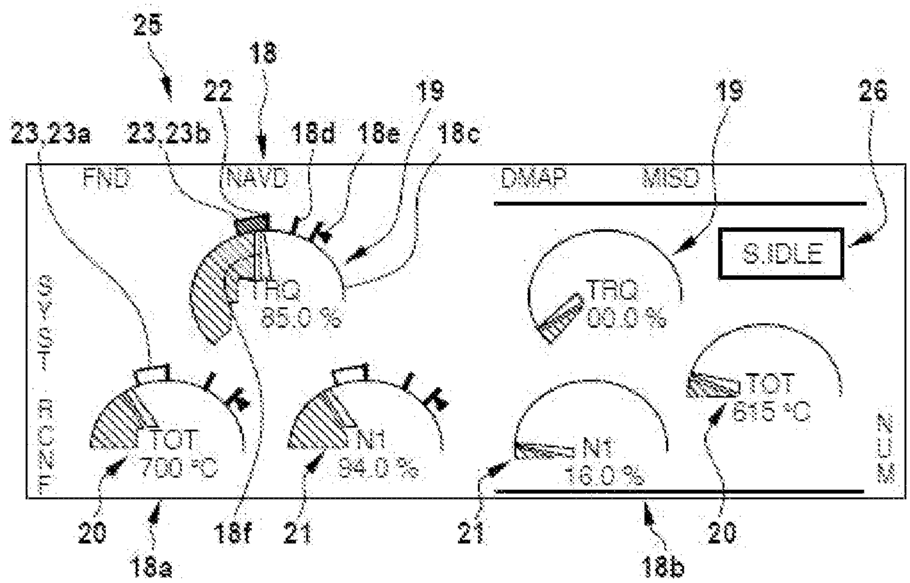
FIG. 5 and FIG. 6 show schematic views of an engine monitoring indicator with engine performance indicators for illustrating a method of processing engine monitoring parameters according to the present disclosure.
Figure 6:
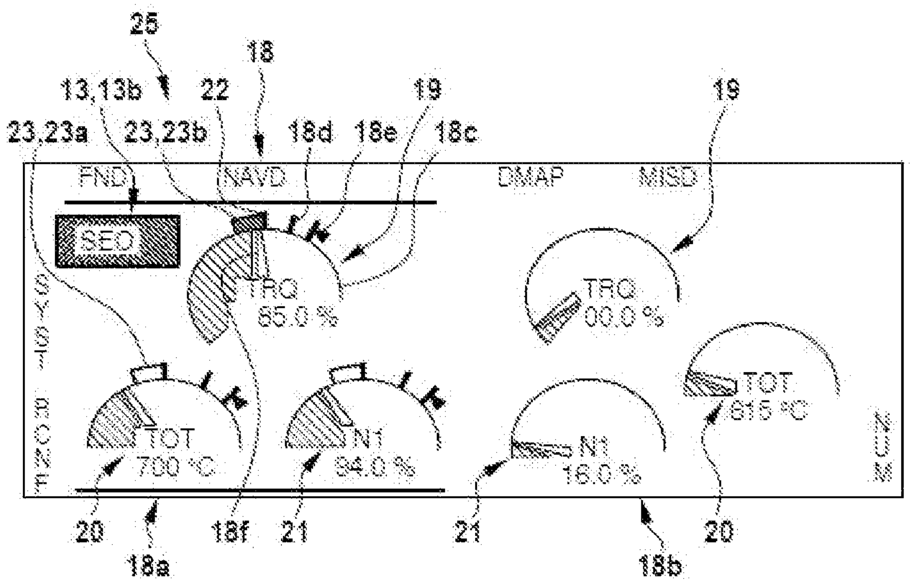

FIG. 5 and FIG. 6 show variants of the method of processing engine monitoring parameters as described above at FIG. 2 to FIG. 4. However, instead of displaying the engine monitoring indicator 11 with the FLI 12 a VMS (or VMD) page 25 with at least one and, illustratively, three engine performance parameter indicators 18 for each one of the two engines 6 of the helicopter 1 of FIG. 1 are shown for visualizing current performance states of the two engines 6 in the SEO mode of the helicopter 1. More particularly, the three engine performance parameter indicators 18 comprise three engine performance parameter indicators 18*a*, which are, by way of example, related to the engine 7 of the helicopter 1, which is operative in the SEO mode, whereas three other engine performance parameter indicators 18*b* are, by way of example, related to the other engine of the two engines 6 of the helicopter 1, which is idled in the SEO mode.

If it is determined that the helicopter 1 is operated in the SEO mode, a super idle or shut-down indicator 26 may be displayed with the engine performance parameter indicators of the idled engine, i. e. in the illustrated example with the engine performance parameter indicators 18*b*, in response to determining that the helicopter 1 is operated in the SEO mode, for visualizing that the helicopter 1 is operated in the SEO mode, as illustrated in FIG. 5. Illustratively, the super idle or shut-down indicator 26 in FIG. 2 comprises an empty rectangle provided with the acronym "S.IDLE" on the VMS page 25 and may further comprise two horizontal lines, as shown. For instance, the horizontal lines, the rectangle and the acronym may be represented in blue. However, any other acronym or indication, as well as any other geometric shapes and/or colors may likewise be used.

Alternatively, if it is determined that the helicopter 1 is operated in the SEO mode, the graphical representation 13*b* of the SEO mode indicator 13 according to FIG. 2, part (B), or FIG. 3 may be displayed with the engine performance parameter indicators of the engine that is operative in the SEO mode, i. e. in the illustrated example with the engine performance parameter indicators 18*a*, in response to determining that the helicopter 1 is operated in the SEO mode, for visualizing that the helicopter 1 is operated in the SEO mode, as illustrated in FIG. 6.

As further illustrated in FIG. 5 and FIG. 6, the three engine performance parameter indicators 18*a*, 18*b* for each one of the two engines 6 may comprise at least one of a torque indicator 19, a temperature indicator 20, and a rotational speed indicator 21. Preferably, the torque indicator 19, the temperature indicator 20, and the rotational speed indicator 21 all have a similar graphical representation so that, for simplicity and brevity, only the graphical representation of the torque indicator 19 of the three engine performance parameter indicators 18*a* is representatively described in more detail hereinafter.

Illustratively, the torque indicator 19 of the three engine performance parameter indicators 18*a* comprises a reference line 18*c* associated with respective engine performance parameters of the engine 7 of FIG. 1, i. e. with respective torque-related engine performance parameters. The reference line 18*c* is illustratively curved and displayed together with a needle indicator 18*f* and a numerical value representation.

However, displaying of the torque indicator 19 in the VMS page 25 is well-known and as such not part of the present disclosure, so that a more detailed description thereof may be omitted for brevity and conciseness. This applies likewise to functionality and functioning of the temperature indicator 20 and the rotational speed indicator 21.

In contrast to a conventional torque indicator the torque indicator 19 may further be displayed with an indicator 18*d* representing a performance parameter equivalent of a maximum 30-second OEI power request, and an indicator 18*e* representing a performance parameter equivalent of a maximum 2-minute OEI power request, preferably in response to determining that the helicopter 1 is operated in the SEO mode. Similar to the FLI 12 of FIG. 2 to FIG. 4, the indicators 18*d* and 18*e* are represented on the reference line 18*c*.

In analogy to FIG. 2, part (B), and FIG. 3, if it is determined that the helicopter 1 is operated in the SEO mode, an indicator 22 is displayed which represents the performance parameter equivalent of the maximum allowable non-nominal power request of the engine 7 which is operative in the SEO mode, in response to determining that the helicopter 1 is operated in the SEO mode.

Moreover, still in analogy to FIG. 2, part (B), and FIG. 3, if it is determined that the helicopter 1 is operated in the SEO mode, an indicator 23 representing the performance parameter equivalent of the allowable non-nominal power request range of the engine 7 which is operative in the SEO mode may be displayed, in response to determining that the helicopter 1 is operated in the SEO mode. Therein, the allowable non-nominal power request range preferably extends between the maximum allowable continuous nominal power request of the engine 7 which is operative in the SEO mode and the maximum allowable non-nominal power request.

More specifically, as long as it may be determined in operation of the helicopter 1 in the SEO mode that the current power request of the engine 7 is outside the allowable non-nominal power request range visualized by the indicator 23, the latter is preferably represented according to a graphical representation 23*a*. By way of example, in the graphical representation 23*a* the indicator 23 is represented as an empty shape, as illustrated with respect to the temperature indicator 20.

If, however, it is determined that the current power request of the engine 7 is inside the allowable non-nominal power request range visualized by the indicator 23, the latter is preferably represented according to a graphical representation 23*b*. By way of example, in the graphical representation 23*b* the indicator 23 is represented as a filled or plain shape, as illustrated with respect to the torque indicator 19. If the indicator 23 is implemented by means of the blue rectangle as described above, then the graphical representation 23*b* is preferably a blue rectangle filled with blue color. However, any other color or geometric shape is likewise contemplated.

Figure 7:
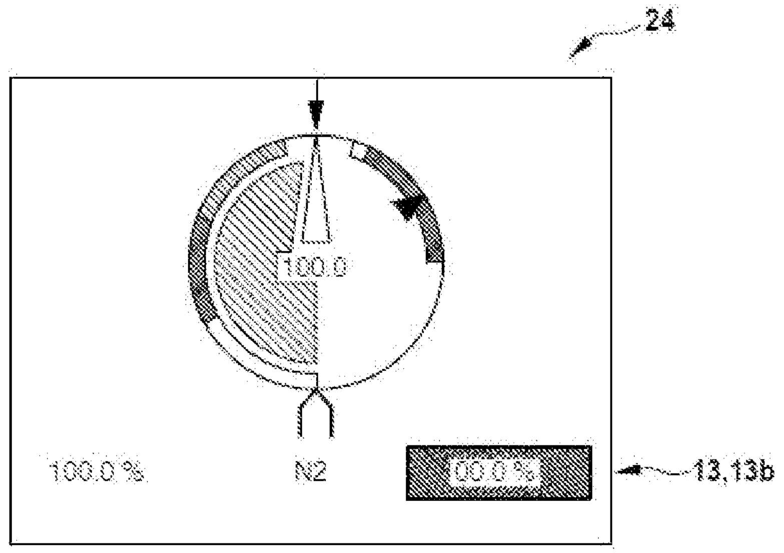
FIG. 7 and FIG. 8 show schematic views of an engine monitoring indicator with a triple speed indicator NR/N2 for illustrating a method of processing engine monitoring parameters according to the present disclosure.
Figure 8:
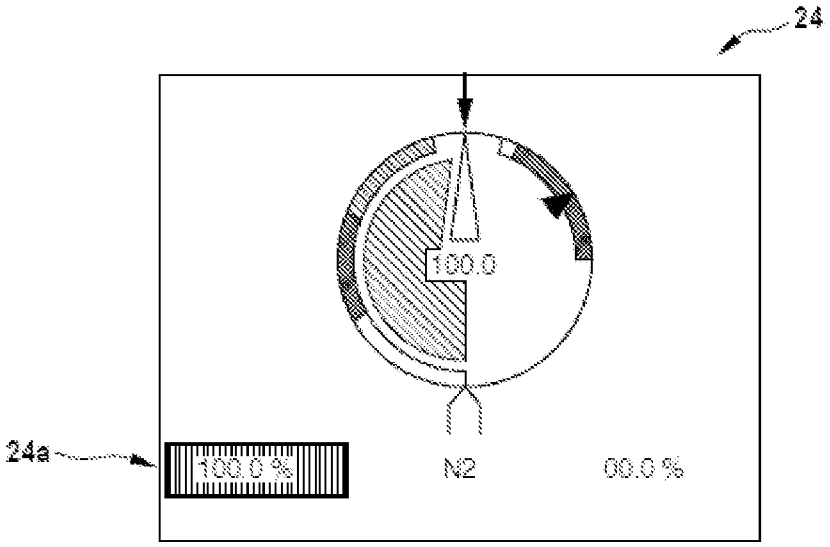

FIG. 7 and FIG. 8 show other variants of the method of processing engine monitoring parameters as described above at FIG. 2 to FIG. 4. However, instead of displaying the engine monitoring indicator 11 with the FLI 12 now a triple speed indicator NR/N2 24 is shown which is displayed for visualizing current performance states of either the idled engine or the operative engine in the SEO mode of the helicopter 1. Nevertheless, it should be noted that functionality and functioning of the triple speed indicator NR/N2 24 as such is considered to be well-known to the person skilled in the art and, therefore, not described in detail hereinafter.

If the triple speed indicator NR/N2 24 is associated with the idled engine of the helicopter 1 of FIG. 1, then e. g. the graphical representation 13*b* of the SEO mode indicator 13 according to FIG. 2, part (B), or FIG. 3 may be displayed with the triple speed indicator NR/N2 24, as illustrated in FIG. 7, in response to determining that the helicopter 1 is operated in the SEO mode. However, in contrast to FIG. 2, part (B), or FIG. 3 the SEO mode indicator 13 is now merely provided with a numerical value "00.0%" indicating that the engine is idle or shut down.

If, in contrast thereto, the triple speed indicator NR/N2 24 is associated with the operative engine of the helicopter 1 of FIG. 1, i. e. the engine 7 of FIG. 1, then e. g. an operation indicator 24*a* may be displayed with the triple speed indicator NR/N2 24, as illustrated in FIG. 8, in response to determining that the helicopter 1 is operated in the SEO mode. The operation indicator 24*a* is illustratively provided with a numerical value "100.0%" indicating that the engine is operative.

Figure 9:
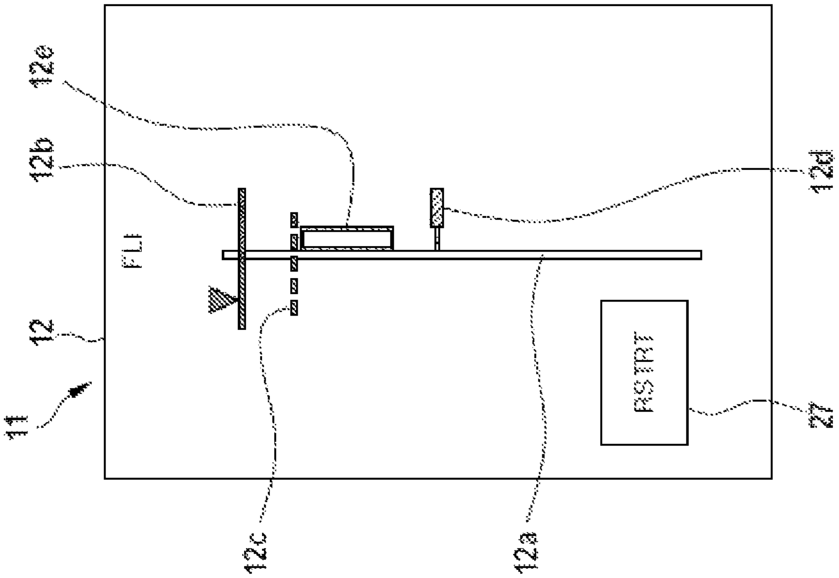

FIG. 9 shows the engine monitoring indicator 11 with the FLI 12 of FIG. 2 and FIG. 3 with the reference line 12*a* and the indicators 12*b*, 12*c*, 12*d* in the SEO mode during a normal restart operation of the idled or shut down engine of the helicopter 1 of FIG. 1. In the context of the present disclosure, a normal restart operation refers to a restart of the idled or shut down engine in response to a pilot-commanded exit of the SEO mode, or a restart of the idled or shut down engine at normal speed upon a detected minor failure.

More specifically, if it is determined, in response to determining that the helicopter 1 is operated in the SEO mode, that the idled or shut down engine is restarted in a normal restart operation for powering the at least one rotor 1*a* of the helicopter 1, an engine restart indicator 27 may be displayed with the engine monitoring indicator 11. The engine restart indicator 27 may be displayed in response to determining that the idled or shut down engine is restarted for powering the at least one rotor 1*a*, for visualizing that the idle or shut down engine is restarted. Furthermore, the indicator 12*e* of a currently available power range for both engines below the maximum 2-minute OEI power request, i. e. below the indicator 12*c*, may be visualized with the FLI 12, in analogy to part (A) of FIG. 2.

Illustratively, the engine restart indicator 27 merely comprises the acronym "RSTRT" to indicate that a normal restart operation is performed. However, any other acronym or indication may likewise be used. Furthermore, the acronym "RSTRT" may be displayed in an empty rectangle or any other geometric shape and in any arbitrarily selected color.

Figure 10:
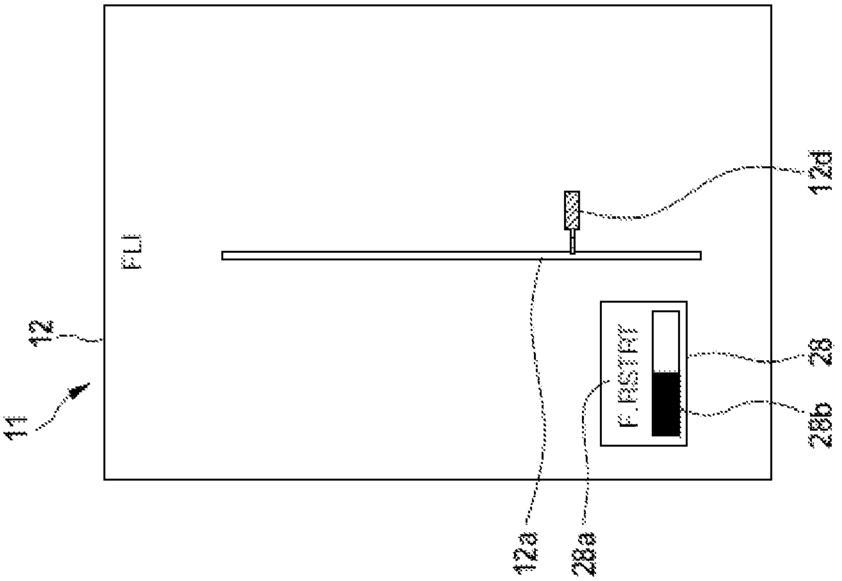
FIG. 9 to FIG. 11 show schematic views of the engine monitoring indicator with the FLI of FIGS. 2A-2B, 3A-3B and 4A-4B for illustrating variants of the method of processing engine monitoring parameters according to the present disclosure.

FIG. 10 shows the engine monitoring indicator 11 with the FLI 12 of FIG. 2 and FIG. 3 with the reference line 12*a* and the indicator 12*d* in the SEO mode during a failure-driven restart operation of the idled or shut down engine of the helicopter 1 of FIG. 1. In the context of the present disclosure, a failure-driven restart operation refers to a restart of the idled or shut down engine in response to a major failure of the engine that is operating in the SEO mode, i. e. the engine 7 of FIG. 1. Preferentially, in case of such a major failure in the SEO mode the idled or shut down engine restarts automatically, i. e. without requiring a dedicated pilot intervention.

More specifically, if it is determined, in response to determining that the helicopter 1 is operated in the SEO mode, that the idled or shut down engine is restarted in a failure-driven restart operation for powering the at least one rotor 1*a* of the helicopter 1, an engine restart indicator 28 may be displayed with the engine monitoring indicator 11. The engine restart indicator 28 may be displayed in response to determining that the idled or shut down engine is restarted for powering the at least one rotor 1*a*, for visualizing that the idled or shut down engine is restarted.

Illustratively, the engine restart indicator 28 comprises a failure-driven restart indicator 28*a* for visualizing the current state of the idled or shut down engine, i. e. for visualizing that the idled or shut down engine is currently restarting, and may further comprise an associated engine speed increase indicator 28*b* of the restarting engine. For instance, the failure-driven restart indicator 28*a* may comprise the acronym "F.RSTRT", however, any other acronym or indication may likewise be used. The acronym "F.RSTRT" may be displayed in an empty rectangle or any other geometric shape and in any arbitrarily selected color for indicating to the pilot that the idled engine is restarting. Furthermore, the failure-driven restart indicator 28*a* may be provided with an additional indication such as "FAST" if a specific restart is commanded. The engine speed increase indicator 28*b*, in turn, may e. g. be associated with display of a suitable bar graph that indicates a respective engine speed N1 or any other parameter for showing the progress during engine start and/or acceleration.

However, it should be noted that the FLI 12 of FIG. 10 merely shows the reference line 12*a*, the indicator 12*d*, and the engine restart indicator 28. In other words, in contrast to FIG. 9 the indicators 12*b*, 12*c*, and 12*e* are omitted to further illustrate the failure of the engine 7.

Figure 11B:
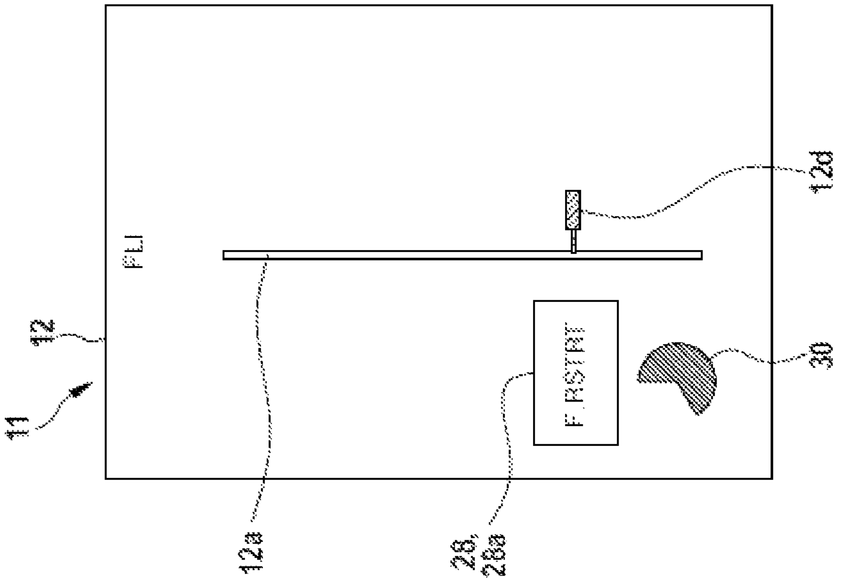
Figure 11A:
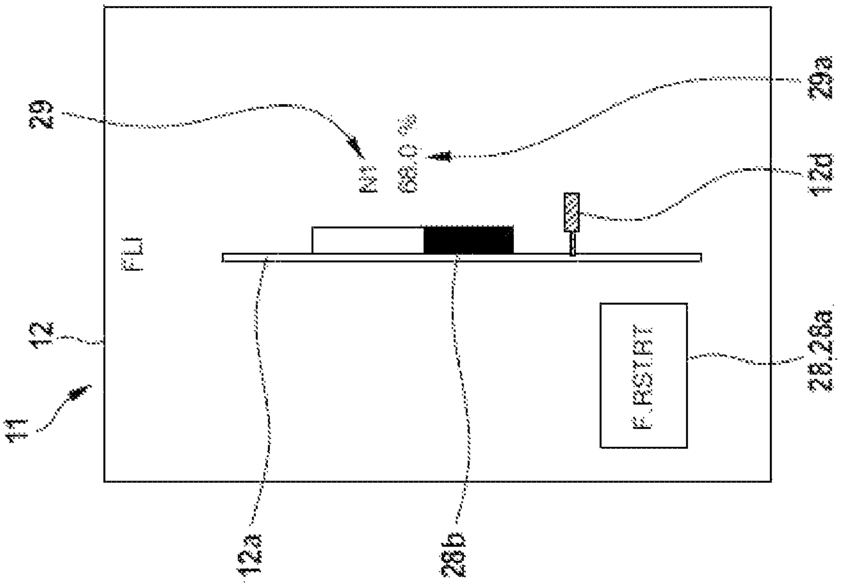

FIG. 11 shows in part (A) and part (B) the engine monitoring indicator 11 with the FLI 12 of FIG. 10, which displays the reference line 12*a*, the indicator 12*d*, and the engine restart indicator 28 with the failure-driven restart indicator 28*a*.

However, in part (A) the engine speed increase indicator 28*b* of FIG. 10 is, in contrast to FIG. 10, displayed close to the reference line 12*a* in a vertical orientation. Furthermore, according to part (A) a rotational speed indicator 29 for the rotational speed N1 of the restarting engine may be displayed, e. g. together with an indicator 29*a* of a current rotational speed of the restarting engine. The indicator 29*a* illustratively displays a numerical value in the form of a percentage.

In part (B), however, the engine speed increase indicator 28*b* is omitted, in contrast to FIG. 10. Instead, a rotational speed indicator 30 for the rotational speed N1 of the restarting engine may be displayed, illustratively in the form of a circular counter.

Finally, it should be noted that modifications to the above-described embodiments are within the common knowledge of the person skilled in the art and, thus, also considered as being part of the present disclosure.

For instance, other SEO mode related indications may be displayed in the various displays described above. For instance, if the SEO mode is unavailable due to a failure that may either prevent from entering the SEO mode, or lead to an automatic exit as described above, a suitable warning message could be displayed in Master List, such as "SEO mode fail" or "SEO mode aborted". Likewise, if there is an unavailability of the SEO mode without failure conditions, but e. g. on power criteria for example the power required by a current flight case is too high to enter the SEO mode, a respective message "SEO mode not available" may be displayed. Finally, there might be some cases where the system decides to automatically restart the idle or shut down engine because of some predefined safety criteria. In this case, a message "SEO mode auto exit" may be displayed to the pilot.

Furthermore, it should be noted that for various displayed or displayable elements and indications geometric shapes and colors may have been described. However, other geometric shapes and colors may likewise be applied.

Moreover, regarding transition to/from SEO mode, there could be a transition through an OEI display, until either the SEO mode is reached or the idled engine has recovered. Finally, reaching of any predefined limit values may be accompanied with suitable audio alarms, and so on.

REFERENCE LIST rotorcraft
1*a* multi-blade main rotor
1*b*, 1*c* rotor blades
1*d* rotor head
1*e* rotor shaft
1*f* landing gear
2 fuselage
2*a* cockpit
2*b* rear fuselage
3 tail boom
3*a* horizontal stabilizer
3*b* tail boom cone
4 counter-torque device
4*a* tail rotor
5 fin
6 engines
7 individual engine
8 data processing system
9 computing device
10 display means
11 engine monitoring indicator
12 first limit indicator
12*a* power margin line
12*b* 30-second OEI indicator
12*c* 2-minute OEI indicator
12*d* current power request indicator
12*e* current available power margin
13 SEO mode indicator
13*a* SEO mode available
13*b* SEO mode entered
14 non-nominal SEO power request range
14*a* power request outside of non-nominal SEO power request range
14*b* power request inside of non-nominal SEO power request range
15 maximum allowable non-nominal SEO power request
16 alert range indicator
17 maximum allowable continuous nominal power request indicator
18 engine performance parameter indicators
18*a* engine performance parameter indicators for first engine
18*b* engine performance parameter indicators for second engine
18*c* reference line
18*d* 30-second OEI indicator
18*e* 2-minute OEI indicator
18*f* needle indicator
19 torque indicator
20 temperature indicator
21 rotational speed indicator
22 maximum allowable non-nominal SEO power request
23 non-nominal SEO power request range
23*a* power request outside of non-nominal SEO power request range
23*b* power request inside of non-nominal SEO power request range
24 triple speed indicator NR/N2
24*a* operation indicator
25 Vehicle Management System page
26 super idle indicator
27 engine restart indicator in normal SEO exit
28 indicator of failure-driven engine restart
28*a* failure-driven engine restart indicator
28*b* engine speed increase indicator of restarting engine
29 rotational speed indicator of restarting engine
29*a* indicator of current rotational speed of restarting engine
30 alternative rotational speed indicator of restarting engine

What is claimed is:

1. A method of processing engine monitoring parameters in a rotorcraft that comprises at least one rotor and at least two engines for powering the at least one rotor in one of an All Engines Operative mode and a Single Engine Operation mode, wherein the engine monitoring parameters are at least indicative of power margins of one engine of the at least two engines of the rotorcraft, the method comprising:

displaying an engine monitoring indicator for the one engine of the at least two engines of the rotorcraft for visualizing a current performance state of the one engine, comprising displaying a first limit indicator including:

a reference line associated with collective-pitch equivalents of engine power requests;

a first indicator representing a collective-pitch equivalent of a maximum 30-second One Engine Inoperative power request;

a second indicator representing a collective-pitch equivalent of a maximum 2-minute One Engine Inoperative power request; and a third indicator representing a collective-pitch equivalent of a current power request;

determining whether the rotorcraft is operated in the All Engines Operative mode, wherein the at least two engines are powering the at least one rotor, or in the Single Engine Operation mode, wherein only the one engine of the at least two engines is powering the at least one rotor;

in response to determining that the rotorcraft is operated in the Single Engine Operation mode:

displaying a first graphical representation of a Single Engine Operation mode indicator with the engine monitoring indicator for visualizing that the rotorcraft is operated in the Single Engine Operation mode;

displaying a fourth indicator representing a collective-pitch equivalent of a maximum allowable non-nominal power request of the one engine of the at least two engines of the rotorcraft in the Single Engine Operation mode; and displaying a fifth indicator representing a collective-pitch equivalent of an allowable non-nominal power request range of the one engine of the at least two engines of the rotorcraft in the Single Engine Operation mode, wherein the allowable non-nominal power request range extends between a maximum allowable continuous nominal power request of the one engine of the at least two engines of the rotorcraft in the Single Engine Operation mode and the maximum allowable non-nominal power request; and in response to determining that the rotorcraft is operated in the All Engines Operative mode, displaying a second graphical representation of the Single Engine Operation mode indicator with the engine monitoring indicator for visualizing that the Single Engine Operation mode is available.

2. The method of claim 1, further comprising, in response to determining that the rotorcraft is operated in the Single Engine Operation mode, determining whether a current power request is above the maximum allowable non-nominal power request and below the maximum 30-second One Engine Inoperative power request of the one engine of the at least two engines of the rotorcraft, and in response to determining that the current power request is above the maximum allowable non-nominal power request and below the maximum 30-second One Engine Inoperative power request, displaying a sixth indicator representing an alert range requesting a pilot of the rotorcraft to switch manually from the Single Engine Operation mode to the All Engines Operative mode.

3. The method of claim 2, wherein the sixth indicator extends between the fourth indicator and the first indicator.

4. The method of claim 1, further comprising, in response to determining that the rotorcraft is operated in the Single Engine Operation mode, displaying a seventh indicator representing a collective-pitch equivalent of the maximum allowable continuous nominal power request of the one engine of the at least two engines of the rotorcraft in the Single Engine Operation mode.

5. The method of claim 1, wherein displaying an engine monitoring indicator for the one engine of the at least two engines of the rotorcraft for visualizing a current performance state of the one engine comprises displaying at least one engine performance parameter indicator including:

a reference line associated with engine performance parameters of the one engine of the at least two engines of the rotorcraft;

a first indicator representing a performance parameter equivalent of a maximum 30-second One Engine Inoperative power request; and a second indicator representing a performance parameter equivalent of a maximum 2-minute One Engine Inoperative power request.

6. The method of claim 5, wherein the at least one engine performance parameter indicator comprises at least one of a torque indicator, a temperature indicator, and a rotational speed indicator for the one engine of the at least two engines of the rotorcraft.

7. The method of claim 5, further comprising, in response to determining that the rotorcraft is operated in the Single Engine Operation mode, displaying a third indicator representing a performance parameter equivalent of a maximum allowable non-nominal power request of the one engine of the at least two engines of the rotorcraft in the Single Engine Operation mode.

8. The method of claim 7, further comprising, in response to determining that the rotorcraft is operated in the Single Engine Operation mode, displaying a fourth indicator representing a performance parameter equivalent of an allowable non-nominal power request range of the one engine of the at least two engines of the rotorcraft in the Single Engine Operation mode, wherein the allowable non-nominal power request range extends between a maximum allowable continuous nominal power request of the one engine of the at least two engines of the rotorcraft in the Single Engine Operation mode and the maximum allowable non-nominal power request.

9. The method of claim 5, wherein displaying an engine monitoring indicator for the one engine of the at least two engines of the rotorcraft for visualizing a current performance state of the one engine comprises displaying a triple speed indicator NR/N2.

10. The method of claim 1, further comprising, in response to determining that the rotorcraft is operated in the Single Engine Operation mode, determining whether another one of the at least two engines is restarted for powering the at least one rotor; and in response to determining that the other one of the at least two engines is restarted for powering the at least one rotor, displaying an engine restart indicator with the engine monitoring indicator for visualizing that the other one of the at least two engines is restarted.

11. The method of claim 10, wherein displaying an engine restart indicator with the engine monitoring indicator for visualizing that the other one of the at least two engines is restarted comprises displaying a restarting engine state indicator for visualizing a current state of the other one of the at least two engines that is restarted.

12. A data processing system for a rotorcraft that comprises at least one rotor and at least two engines for powering the at least one rotor in one of an All Engines Operative mode and a Single Engine Operation mode, the data processing system comprising at least one computing device and at least one display means, wherein the data processing system is configured to perform a method of processing engine monitoring parameters according to claim 1.

13. A rotorcraft with at least one rotor and at least two engines for powering the at least one rotor in one of an All Engines Operative mode and a Single Engine Operation mode, comprising a data processing system with at least one computing device and at least one display means, wherein the data processing system is configured to perform a method of processing engine monitoring parameters according to claim 1.

14. The method of claim 1, wherein displaying the Single Engine Operation mode indicator with the engine monitoring indicator comprises displaying the Single Engine Operation mode indicator simultaneously with the engine monitoring indicator.

15. The method of claim 1, wherein the first graphical representation and the second graphical representation are visually distinct from one another.

16. A method of processing engine monitoring parameters in a rotorcraft that comprises a rotor and two engines for powering the rotor in one of an All Engines Operative mode and a Single Engine Operation mode, wherein the engine monitoring parameters are indicative of power margins of one engine of the two engines of the rotorcraft, the method comprising:

displaying an engine monitoring indicator for the one engine of the two engines of the rotorcraft for visualizing a current performance state of the one engine, comprising displaying a first limit indicator including:

a reference line associated with collective-pitch equivalents of engine power requests;

a first indicator representing a collective-pitch equivalent of a maximum 30-second One Engine Inoperative power request;

a second indicator representing a collective-pitch equivalent of a maximum 2-minute One Engine Inoperative power request; and a third indicator representing a collective-pitch equivalent of a current power request;

determining whether the rotorcraft is operated in the All Engines Operative mode, wherein the two engines are powering the rotor, or in the Single Engine Operation mode, wherein only the one engine of the two engines is powering the rotor; and in response to determining that the rotorcraft is operated in the Single Engine Operation mode, displaying a first graphical representation of a Single Engine Operation mode indicator with the engine monitoring indicator for visualizing that the rotorcraft is operated in the Single Engine Operation mode, displaying a fourth indicator representing a collective-pitch equivalent of a maximum allowable non-nominal power request of the one engine of the at least two engines of the rotorcraft in the Single Engine Operation mode; and displaying a fifth indicator representing a collective-pitch equivalent of an allowable non-nominal power request range of the one engine of the at least two engines of the rotorcraft in the Single Engine Operation mode;

wherein the allowable non-nominal power request range extends between a maximum allowable continuous nominal power request of the one engine of the at least two engines of the rotorcraft in the Single Engine Operation mode and the maximum allowable non-nominal power request; and in response to determining that the rotorcraft is operated in the All Engines Operative mode, displaying a second graphical representation of the Single Engine Operation mode indicator with the engine monitoring indicator for visualizing that the Single Engine Operation mode is available.

17. A method of processing engine monitoring parameters in a rotorcraft that comprises a rotor and two engines for powering the rotor in one of an All Engines Operative mode and a Single Engine Operation mode, wherein the engine monitoring parameters are indicative of power margins of one of the engines of the rotorcraft, the method comprising:

displaying an engine monitoring indicator for one of the engines of the rotorcraft for visualizing a current performance state of the engine, comprising displaying a first limit indicator including:

a reference line associated with collective-pitch equivalents of engine power requests;

a first indicator representing a collective-pitch equivalent of a maximum 30-second One Engine Inoperative power request;

a second indicator representing a collective-pitch equivalent of a maximum 2-minute One Engine Inoperative power request; and a third indicator representing a collective-pitch equivalent of a current power request;

determining whether the rotorcraft is operated in the All Engines Operative mode, wherein the two engines are powering the rotor, or in the Single Engine Operation mode, wherein only one of the engines is powering the rotor; and in response to determining that the rotorcraft is operated in the Single Engine Operation mode, displaying a first graphical representation of a Single Engine Operation mode indicator with the engine monitoring indicator for visualizing that the rotorcraft is operated in the Single Engine Operation mode, displaying a fourth indicator representing a collective-pitch equivalent of a maximum allowable non-nominal power request of the one engine of the at least two engines of the rotorcraft in the Single Engine Operation mode; and displaying a fifth indicator representing a collective-pitch equivalent of an allowable non-nominal power request range of the one engine of the at least two engines of the rotorcraft in the Single Engine Operation mode;

wherein the allowable non-nominal power request range extends between a maximum allowable continuous nominal power request of the one engine of the at least two engines of the rotorcraft in the Single Engine Operation mode and the maximum allowable non-nominal power request; and in response to determining that the rotorcraft is operated in the All Engines Operative mode, displaying a second graphical representation of the Single Engine Operation mode indicator with the engine monitoring indicator for visualizing that the Single Engine Operation mode is available.

* * * * *